June 4, 1929.  J. B. ARMITAGE  1,715,488

TRANSMISSION AND CONTROL MECHANISM FOR MACHINE TOOLS

Filed Aug. 24, 1925  7 Sheets-Sheet 1

INVENTOR
Joseph B Armitage
BY Fred G Parsons
ATTORNEY

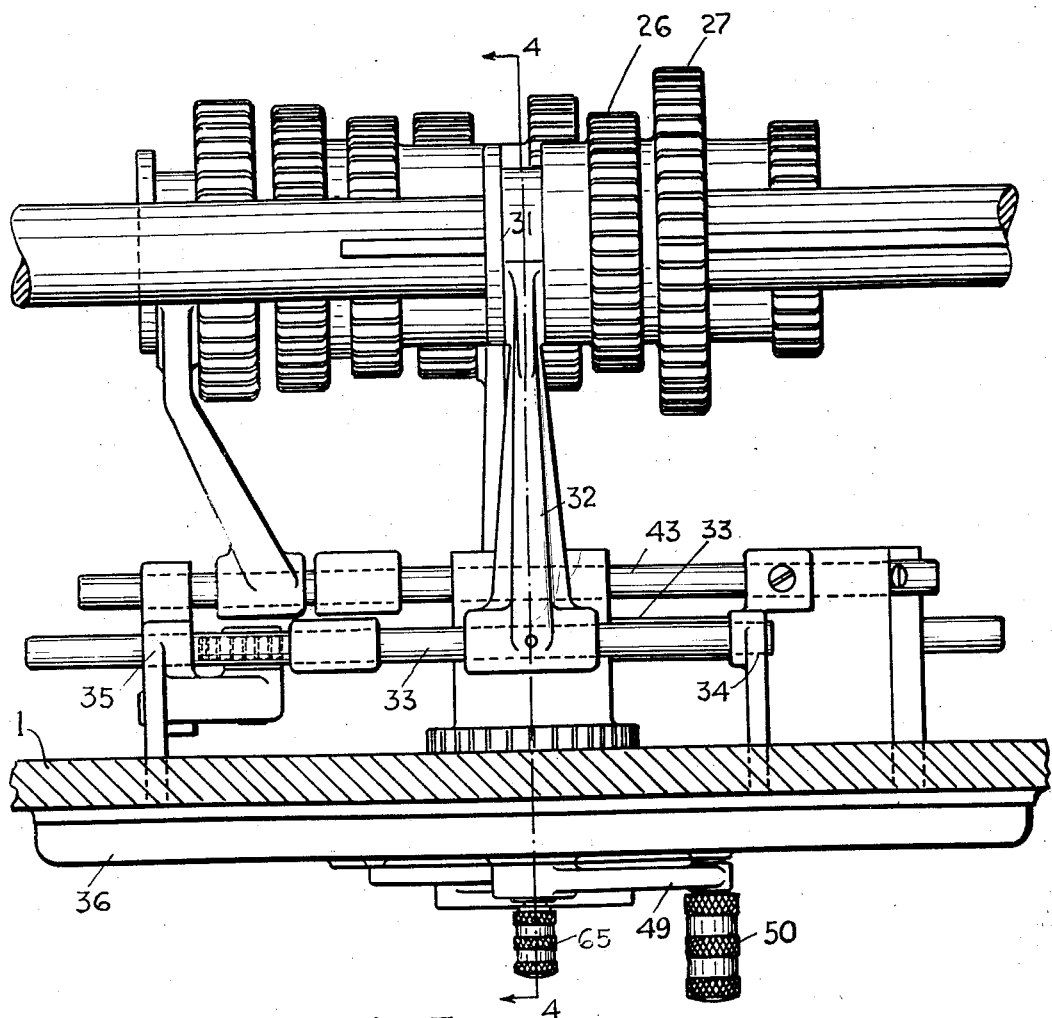

June 4, 1929.  J. B. ARMITAGE  1,715,488
TRANSMISSION AND CONTROL MECHANISM FOR MACHINE TOOLS
Filed Aug. 24, 1925  7 Sheets-Sheet 3

INVENTOR.
Joseph B Armitage
BY Fred A Parsons
ATTORNEY.

June 4, 1929.   J. B. ARMITAGE   1,715,488
TRANSMISSION AND CONTROL MECHANISM FOR MACHINE TOOLS
Filed Aug. 24, 1925   7 Sheets-Sheet 4

INVENTOR.
Joseph B Armitage
BY Fred G Parsons
ATTORNEY.

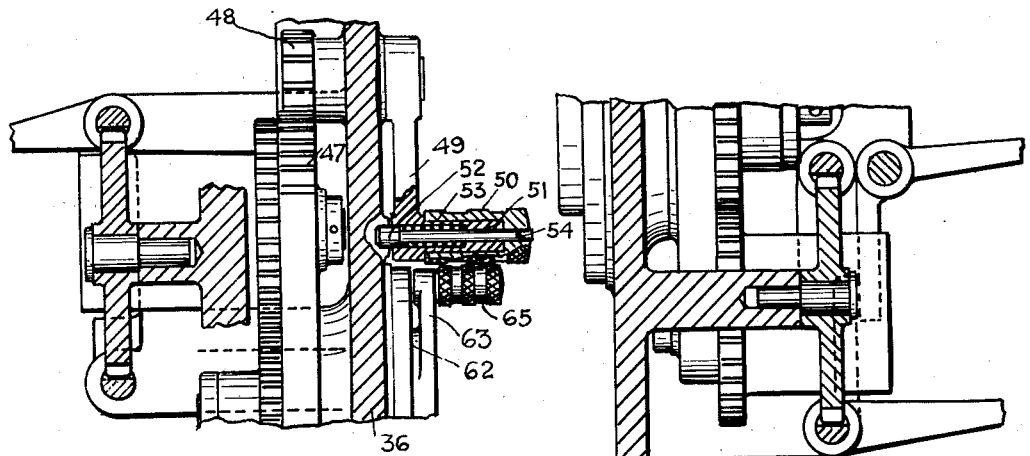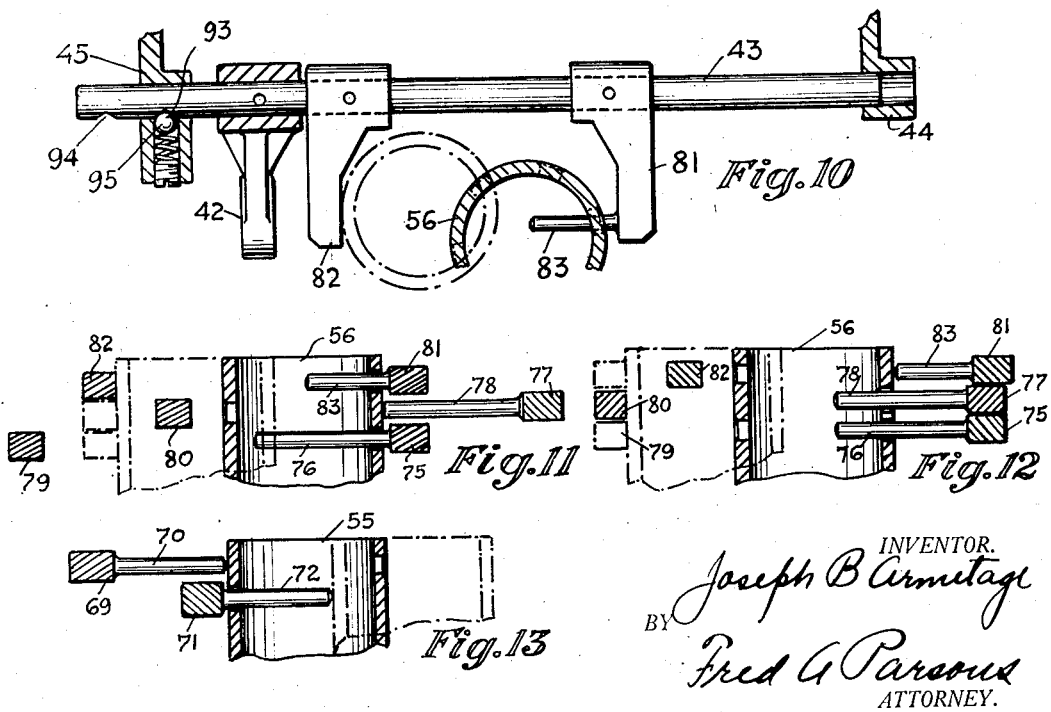

June 4, 1929.　　　J. B. ARMITAGE　　　1,715,488
TRANSMISSION AND CONTROL MECHANISM FOR MACHINE TOOLS Filed Aug. 24, 1925　　　7 Sheets-Sheet 6

INVENTOR
Joseph B Armitage
BY Fred G Parsons
ATTORNEY

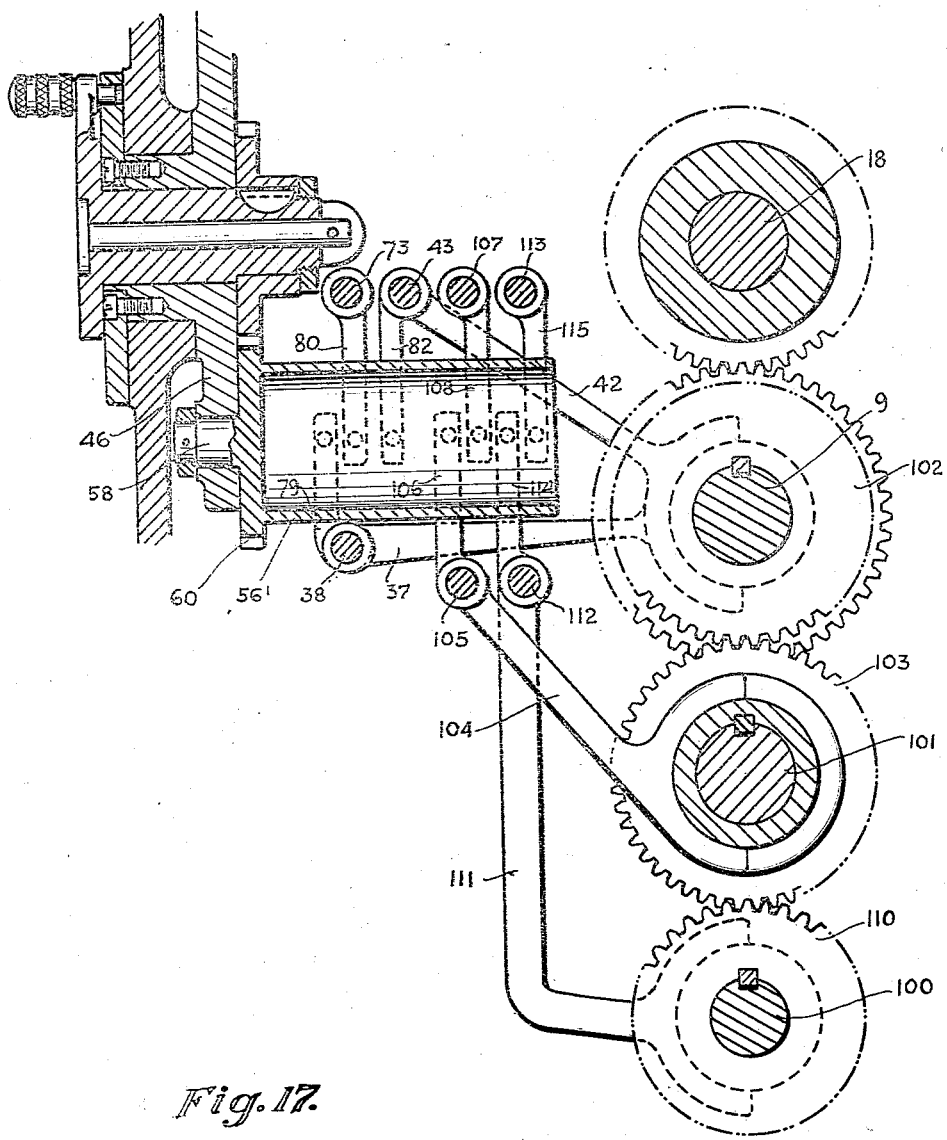

Patented June 4, 1929.

1,715,488

UNITED STATES PATENT OFFICE.

JOSEPH B. ARMITAGE, OF MILWAUKEE, WISCONSIN, ASSIGNOR TO KEARNEY & TRECKER CORPORATION, OF WEST ALLIS, WISCONSIN.

TRANSMISSION AND CONTROL MECHANISM FOR MACHINE TOOLS.

Application filed August 24, 1925. Serial No. 52,189. REISSUED

This invention is directed toward an improved transmission and control mechanism for machine tools, and more particularly toward a form of control mechanism suitable for shifting the elements of power transmitting speed change trains in machine tools.

It is the general object of this invention to simplify transmission and control mechanism for machine tools and to render such mechanism more convenient. It is particularly desired to render such mechanism convenient for shifting the elements of a multi-speed transmission train suitable for machine tools and for indicating the particular speed at which the driven element of the train will be operated in any given adjustment of the mechanism.

Power transmitting speed change trains are commonly used in machine tools for obtaining a variety of tool or work speeds or rates, and a considerable variety of train element combinations are used for this purpose. In all such trains a change of speed or rate is brought about by altering the driving relationship of some of the train elements, whereby different train portions may be caused to transmit the power through the train.

Such mechanisms as are now in use to effect or control the desired changes in the driving relationship of the train elements, and particularly when the number of changes is large, consist mainly of a plurality of hand levers, each of which when moved by the operator, affects through appropriate shifting devices, its own particular portion of the speed train. The combined effect of the train element or the particular rate of speed obtained by the entire train for any given combination of lever positions must in such case be determined by the operator by first noting the lever positions and then referring to an index plate or chart, upon which the rate effected by the various train element combinations is plotted against the various lever combinations. If the operator desires to obtain a specific speed rate, the process is reversed. He then first determines from the plate or chart the lever positions corresponding to the required rate and subsequently moves the various levers one after another, until they are in the required position.

In certain instances, but only where the variety of rates obtainable from the train is small, four only or less, they have all been directly controlled by a single lever having a variety of positions each productive of a certain combination of elements in the train, as in certain automobile gear shift devices but machine tools usually require a greater number of changes for which such devices are not suitable.

In other instances, the movement of the element shifting device is effected by a hand control acting through cam combinations or similar means, whereby the control of the various individual shifters is obtained from a single hand operated lever through intermediate cams, but this necessitates passing through a variety of undesired positions of the various elements of the train and its controlling mechanism, before arriving at a given desired position from some or most of the other possible positions. In other words, the shifting mechanism is not directly selective.

It will be understood from the foregoing that it is a principal purpose of the present invention to provide a novel and improved shifting device for variable speed transmission trains such as are suitable for use in machine tools, and particularly such as have a number of rate changing devices or gear sets in series, whereby changes in one affect the other to produce a final rate which is compounded from the several sets, the shifting device being directly selective whereby the position of elements shiftable for the purpose of deriving certain power transmission ratios through the train may be arrived at directly without passing through or setting up other combinations of element positions such as may be productive of undesired speeds.

A further purpose is to produce a shifter device for the selective control or positioning of the elements of a variable speed transmission train which will permit of combination with direct reading speed indicating means such as a chart or plate having numerals or divisions, and a pointer or indicator relatively movable with the chart to directly indicate the rate or speed produced by the train.

Another purpose is to devise a shifter mechanism, which being combined with a chart or plate, together with a speed indicating means as just described, will permit the grouping of the numerals or subdivisions on the chart or plate in a sequence or order regularly increasing or decreasing in accordance with the numerical value of the speeds or rates produced by the train.

It is a further purpose to ensure the operative meshing by a single shifting movement of desired gears in a plurality of speed changing mechanisms, the meshing of gears in both mechanisms being assured by the provisions of means for maintaining at least one of the gears to be meshed in motion at the time of contact, and by means for the positive actuation of the shiftable gears, whereby the operator may exert upon the shifting lever any degree of force required to effect the operative engagement or mesh of all gears.

It is a further object of the invention to provide a device of this character so organized that rotatable and bodily movable selectors will act upon the gear shifting elements along lines radial with respect to the axis of rotation of the selector. In this manner it is possible to multiply indefinitely the number of independent gear shifting movements which can be performed by a single selector, it being merely necessary to increase the axial extent of the selector to accommodate any number of gear shifting elements aligned axially along such extent.

Another purpose relates to an interlocking or dependent arrangement between the shifting portions and the indicating portion of a combined shifter and indicator whereby certain of the functions or movements of each portion must be performed, if at all, in a certain sequence or order, such as, for example, that the shifter mechanism must be moved to bring certain shiftable train elements into a neutral or non-power-transmitting position before the indicating pointer may be moved from one speed indicating position into another, whereby if power is being transmitted at all the indicating pointer must indicate the correct rate or speed.

Another purpose is to provide a shifter and speed indicating device wherein certain functions as just noted must be performed in a certain sequence or order, while other functions may be performed in any order, as for instance the movement of certain of the controlled transmission train elements from any one of their relative positions of combination into any other of their possible relative positions of combination.

Another purpose relates to producing a shifter which will control all of the various shiftable elements of a transmission train, and in a directly selective manner but with the minimum movement of shiftable train elements, so that, for instance, although certain elements of the train, for certain reasons, may be arranged to be moved to a neutral or non-power-transmitting position before the indicating portion of the device may be moved or positioned for a new or different rate, yet other train elements may be left in any previous position of power transmitting engagement until the indicating device has been positioned and will then be moved only in case the indicated new rate requires a different position of the element. It is a further purpose to organize the shifting mechanism in such a manner that if the shifting of such other train elements is required to accomplish the indicated new rate, such other elements may be disengaged from their original positions of mesh and moved to a neutral position during the same operation required for the movement of the neutral elements to positions of mesh.

Other purposes relates generally to simplification and improvement in the construction and convenience of use and operation of means for shifting the elements of a multispeed transmission train suitable for machine tools and for indicating the particular speed which will result from any operation of the shifting mechanism. Such other purposes will be apparent to those familiar with the art, from the specification, claims and drawings accompanying this application.

In the drawings:

Fig. 3 is an enlarged detail taken in section on line 3—3 of Fig. 1, the column being broken away and the shiftable gearing and gear shifting mechanism comprising the particular subject matter of this application being shown in plan.

Fig. 7 is a fragmentary section taken on line 7—7 of Fig. 6.

Fig. 8 is a fragmentary section taken on line 8—8 of Fig. 6.

Fig. 10 is a section taken on line 10—10 of Fig. 4.

Fig. 11 is a fragmentary section taken on line 11—11 of Fig. 4.

Fig. 12 is a view similar to Fig. 11, showing the parts in different relative positions.

Fig. 13 is a fragmentary section taken on line 13—13 of Fig. 4.

Fig. 17 is a diagrammatic view in vertical section of a modified form of the invention illustrating the use of selector cylinders such as those disclosed herein for the operation of additional sets of shiftable gears.

Like parts are identified by the same reference characters throughout the several views.

The column 1 of the milling machine supports a variety of work supports including a knee 2 vertically slidable thereon, a saddle 3 slidable on the knee 2, and a table 4 slidable on the saddle. The column likewise rotatably supports a tool spindle or tool support 5, journaled in suitable bearings. Ordinarily in machines of this type, mechanism is provided for hand and power movement of all of the movable work supports including the knee, table, and saddle, relative to the spindle or tool support, and with speed change mechanism to provide for varying the rate of the power movement, such mechanisms are familiar to all those familiar with the art, and for the sake of clearness such parts have been in the present instance omitted, although my invention which is here shown applied to the spindle or tool support speed change mechanism as will be later described, might equally be applied to the rate changer or speed change mechanism for varying the rate of power actuation of one or all of the other supports, that is the knee, table, and saddle or to the other speed or rate change mechanisms required for power movement of any machine tool support.

Figure 1:
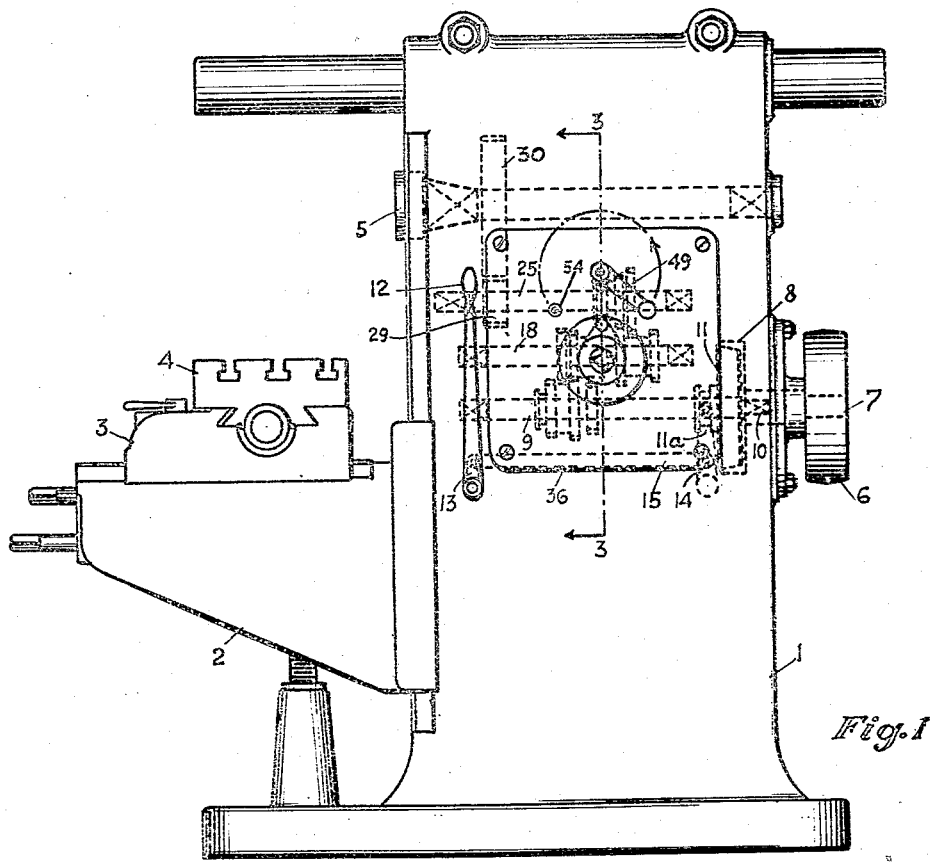
Fig. 1 is a side elevation from the right of a machine tool which is of the type well known as a knee and column milling machine, and which embodies my invention in mechanism employed to drive the spindle and to regulate the speed thereof.
Figure 2:
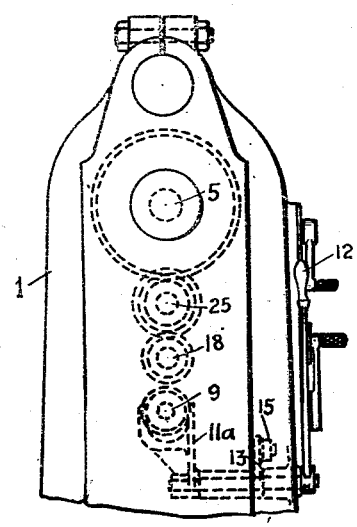
Fig. 2 is a front elevation of the upper portion of the column which houses the spindle driving trains.

For driving the spindle or tool support 5 at variable rotative speed, the following mechanism is used:

A pulley 6 is adapted to be belt-driven from any suitable power source, and is fixed on a shaft 7 rotatably supported in suitable bearings in the column 1. Fixed with the shaft 7 is a clutch element 8. Axially aligned with shaft 7 is a shaft 9 provided on the one end with a bearing in the column 1 and on the other end with a reduced diameter 10 having a bearing in the end of the shaft 7. Fixed with, but slidable on the shaft 9, is a clutch member 11 adapted when moved in the one direction to frictionally engage the clutch element 8, and when so engaged, if the pulley 6 is driven, to drive shaft 9. A fork 11ª engages a groove or spool in the clutch element 11, and may be moved to move the element 11 by means of a hand lever 12 through the medium of suitable levers 13 and 14 connected on the interior of the column by means of a rod or link 15. By this means, when the hand lever 12 is moved to the rear or to the right in Figure 1, the clutch element 11 will eventually engage the clutch element 8, and assuming that the element 8 is driven by means of the pulley 6, will cause the shaft 9 to be driven at the same speed as the pulley 6. It will thus be seen that the shaft 9 may, at the will of the operator, be caused to be revolved at the rotative speed of the pulley 6, or in case the handle 12 is moved oppositely to the above described movement, will remain stationary.

Intermediate between the shaft 9 and the spindle 5 are a series of gears and shafts adapted for changing the rate of spindle rotation, as will be now described. The shaft 9 is in serial driving relationship to a shaft 18, either through a gear 19 slidably keyed to shaft 9 which may engage and drive a gear 20 fixed with shaft 18, or through a gear 21 slidably keyed to shaft 9 which may engage and drive a gear 22 fixed with the shaft 18, or through a gear 23 fixed with the gear 21 to form a unitary pair and which may engage and drive a gear 24 fixed with the shaft 18. The shaft 18, which is provided with suitable bearings in the column 1, may thus be driven from shaft 9 by any one of three gear pairs, it being understood when any one pair of gear is engaged, the others must be disengaged, the engagement or disengagement being determined by means which will be later described. Thus any one of three different rotative speeds may be applied to the shaft 18 from a single rotative speed of the shaft 9.

A shaft 25 is provided with suitable bearings in the column 1 and slidably mounted thereon is unitary pair of gears 26 and 27 which may be engaged with the gears 24 and 28, respectively, fixed with the shaft 18. It will thus be seen that as between shafts 18 and 25 two rotative speeds may be obtained for each speed of the shaft 18 accordingly as whether gears 24 and 26 or gears 28 and 27 are engaged, the engagement being determined by means which will be later described.

Fixed with the shaft 25 is a pinion 29 engaging a gear 30 fixed on the spindle, 5, whereby any rotative speed transmitted by the means previously described to the shaft 24 will be in turn transmitted to the spindle. It will now be seen that with a single rotative speed of the driving pulley 6, any one of six rotative speeds may be applied to the spindle 5 accordingly as the various elements of the train are engaged or disengaged.

For the sake of simplicity, the number of speeds has been limited in this instance to six only, but it will be understood that the means here employed for obtaining six speeds might readily be applied for the obtaining of any larger number, and with control means similar to those here employed, it being only necessary to duplicate suitable portions of the mechanism here shown. As will be shown hereinafter, the advantage of using a selector of the drum form consists in the fact that any given selector, may, by simply increasing its length, be adapted to act along the lines of its radius upon any number of gear shift pins.

The unitary gear pair consisting of gears 26 and 27 is provided with a spool or groove 31 which is engaged by a fork 32 fixed on a rod 33 slidably guided in suitable bearings in projecting lugs 34 and 35 of a frame or plate 36 removably fixed to the column 1; thus whenever the rod 33 is shifted by means which will be later described, the gear pair consisting of gears 26 and 27 may be moved to engage the gears 24 and 28 respectively.

The gears of the unitary pair consisting of gears 21 and 23 are so spaced that a spool or groove 21$^a$ exits between the gears of the pair, which is engaged by a fork or shifter 37 fixed with a rod 38 slidably mounted in projecting lugs 39 and 40 in the plate 36. When the rod 38 is shifted by means which will be later described, the unitary gear pair consisting of gears 20 and 22 will be shifted through the medium of the fork 37.

The gear 19 is provided with a spool or groove 41 which is engaged by a fork or shifter 42 fixed with a rod 43 slidably mounted in projecting lugs 44 and 45 of the plate 36. When the rod 43 is shifted by means which will be later described, the gear 19 will be shifted through the medium of the fork 42.

I will now describe the means whereby the rods 33, 38 and 43 may be shifted, and whereby choice may be made as to which of the rods and hence the gears controlled thereby, may be shifted, and as to which direction a shifting shall take place.

Figure 4:
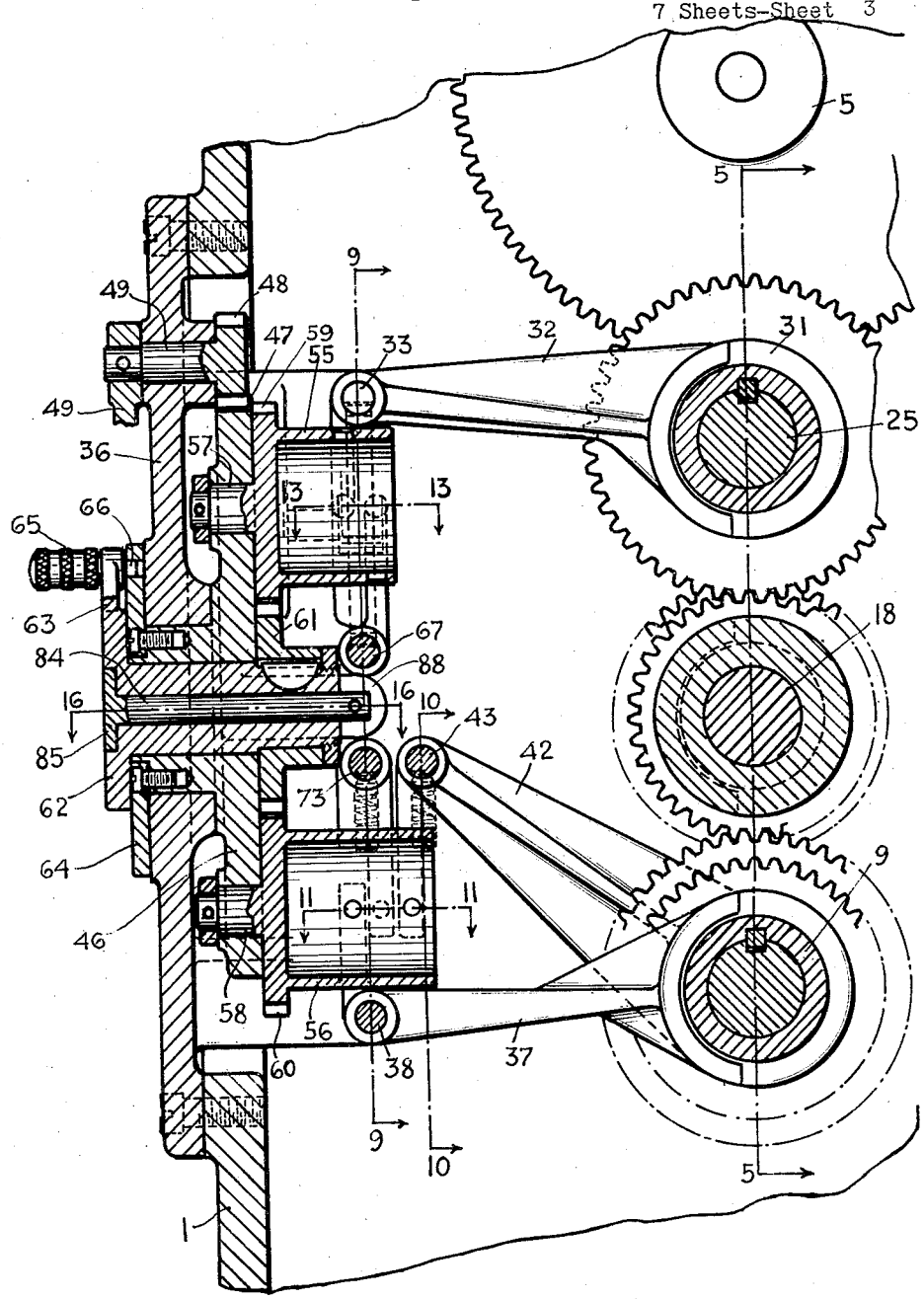
Fig. 4 is a section taken on line 4—4 of Fig. 3.

The frame or plate 36 has journaled or pivoted in a suitable bearing a carrier member 46 arranged for limited swinging or oscillating movement about a center or axis coinciding with the line 16—16 of Fig. 4. The member 46 may be caused to travel through a limited angle or arc by means of gear teeth 47 forming a segment at the upper end of the member 46 and engaged by a pinion 48, the shank or stem of which is journaled in a bearing 49 in the plate 36. The movement is manually controlled by a lever 49 terminating in a hand-grip 50 sliding over the lever end portion 51 on which the grip 50 fits. Inside the lever end is a plunger 52 fixed to move in a bore in the lever end and normally pressed toward the plate 35 by the means of a spring 53. The plunger 52 and the hand-grip 50 are fixed to move together by the means of a pin 54, and the hand-grip may therefore be utilized both to move the lever 49 and to withdraw the plunger 52 against the pressure of spring 53. Holes are provided in the plate 36 for the entry of the plunger 52, when the lever 49 is in either of two positions corresponding to the two desired positions of the member 46. One of these holes is shown at 54 in Fig. 1 and Fig. 3, the other, with which, in the figures named, the plunger is engaged, is hidden by the lever 49.

The member 46 carries a pair of hollow drum elements or selectors 55 and 56 having stems journaled in bearings 57 and 58 respectively. Integral with the respective drums are gears 59 and 60, both of which mesh with a central gear 61 fixed on the shank of a sleeve element 62 which is journaled in the member 46.

The sleeve 62 may be revolved by the means of a hand lever 63, and in such case the drums will be caused to revolve, or take up different angular positions. Six different angular positions of rotation or adjustment are specially designated, there being an index plate 64 fixed with the member 46 and having six holes as shown in Fig. 4.

The lever 63 is provided with a hand-grip 65 and a plunger 66, similar to the hand-grip and plunger previously described for the lever 49, the plunger 66 being adapted to engage any one of the six holes in index plate 64 as the member 62 and the drums 55 and 56 controlled thereby are rotated to the corresponding position. The gearing intermediate the lever 63 and the drums 55 and 56, is so proportioned that the drums will have an angular movement equal to the angular movement of the handle or lever 63, and each drum therefore has six angular positions corresponding to the six holes in the index plate 64.

It will be noted from the above that the selector drums 55 and 56 have two movements, the one being a motion of translation manually controlled by the lever 49 and hand-grip 50; and the other being a movement of rotation, manually controlled by the lever 63 and the hand-grip 65.

The drum element movement of translation is utilized for the shifting of the various gear elements of the transmission train and the axial drum movement is utilized for choosing which gears shall be moved and in which direction, as will now be described in detail.

Figure 9:
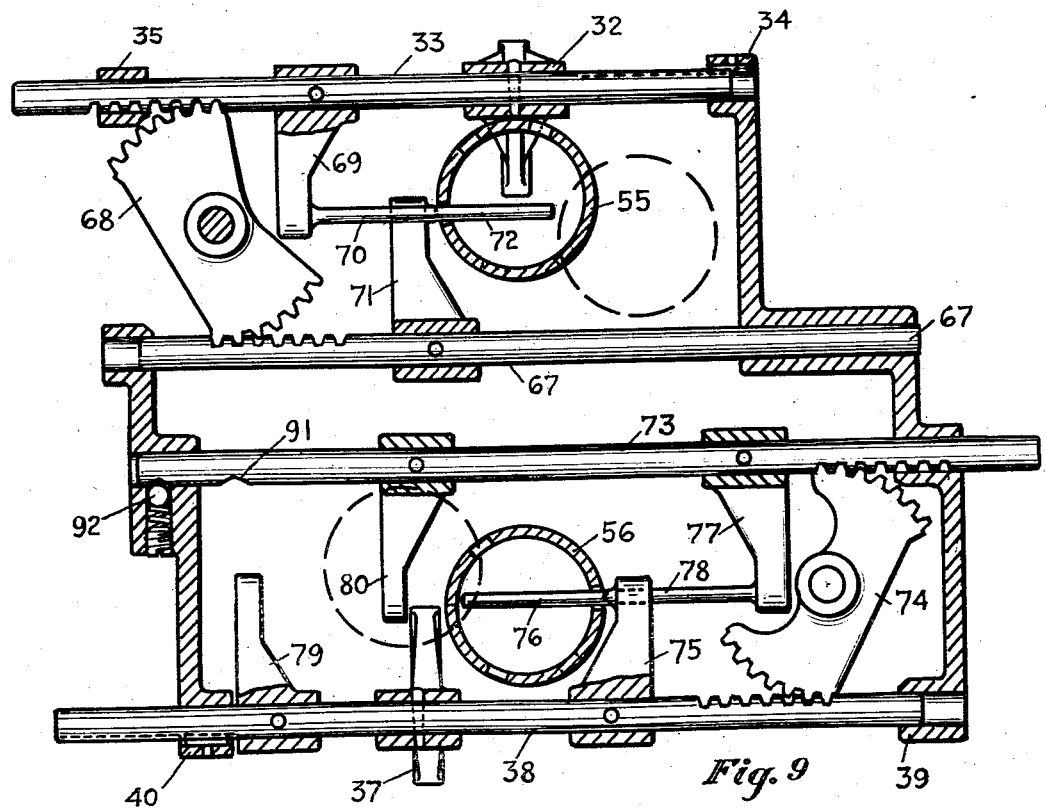
Fig. 9 is a fragmentary section taken on line 9—9 of Fig. 4.

The one position of the drum elements 55 and 56 is shown by the full lines in Fig. 9, while the other position is shown by the dotted lines. The rod 33, previously described as controlling the movement of the gear pair consisting of gears 26 and 27, is connected for movement with a rod 67 disposed on the opposite side of the drum element 55, by means of a pivoted segment 68, the arrangement being such, as shown in Fig. 9, that the rods move oppositely, but to the same extent, and if either rod is moved the other will likewise be caused to move, and an equal amount.

Fixed on the rod 33 is an arm 69 carrying a projecting pin 70 which is in this case made integral with the arm. Fixed on the rod 67 is an arm 71 carrying a projecting pin 72, It will now be seen that the previously described requirement movement of the gears 26 and 27 will correspond, owing to the various mechanism disclosed, to a specific movement of the pin 70 and 72. When the pins are in the position shown in Fig. 9 the gears 26 and 27 are in the position shown in Fig. 5, gear 26 being engaged with gear 24; if, however, from any cause either pin is forced to move, a movement of the gear pair will take place. Assuming, for instance, that the drum element 55 is moved to the dotted position shown in Fig. 9, and while there is axially turned until the drum element surface presents a solid portion to the pin 72, and a hole to the pin 70. If the drum element is then returned to the position shown in Fig. 9, the pin 72 would thereupon be forced to the left, moving the rod 67 to the left, and through the pivoted segment 68, moving the rod 33 to the right. The movement of the rod 33 carries with it, by means of the fork 32, the gear pair consisting of gears 26 and 27, and the various parts are so proportioned that when the drum element 55 has reached the position shown in Fig. 9, the gear pair will be moved the required amount to fully engage the gear 27 with the gear 28.

If when in that position the above described action were repeated but the selector drum element, when in the indicated dotted position, were now axially turned back to the original position, or to any other position, in which its surface presented a solid portion to the pin 70 and a hole to the pin 72, the gears 26 and 27 would, upon completing the translation movement of the drum element, be moved back again to the left until the gear 26 again engaged gear 24.

It will thus be seen that the gear pair consisting of the gears 26 and 27 may be moved in either direction, to either of the active gear positions by a movement of the drum element 55, from the right or dotted position of the element shown in Fig. 9 to the left or full line position there shown, and that which movement shall take place is determined by the angular position of adjustment of the drum element and by the corresponding configuration of its surface.

The rod 38 is connected with a rod 73 by means of a pivoted segment 74 in a manner and with an effect similar to the connection of the rods 33 and 67.

Fixed on the rod 38 is an arm 75 provided with an extending pin 76, and fixed on the rod 73 is a similar arm 77 having a pin 78. The rods 38 and 73, together with their respective pins, co-act with the drum element 56 to shift the gear pair consisting of the gears 21 and 23 in either direction through the medium of the fork 37 in a manner precisely similar to the previously described movement set up for the gears 26 and 27 by the drum element 55, moving the gear 21 into engagement with gear 22, or the gear 23 into engagement with gear 24, as determined by an angular positioning of the drum element 56 when in the position of translation as indicated by the dotted lines of Fig. 9, and by the configuration of the drum face or shell, which is presented to the pins 76 and 78 by such axial positioning.

Fixed on the rod 38 is a striker-arm 79, and fixed on the rod 73 is a striker-arm 80. The striker-arms 79 and 80 are of such extension, and are so fixed on the respective rods, that during the movement of the selector drum 56 to the dotted position shown in Fig. 9, the one or the other will be contacted accordingly as the one or the other of the rods 73 or 38 have previously been shifted to the right in Fig. 9 during the movement previously described for the shifting of the gears 21 and 23. If for instance, the previous shifting of the gears has placed the gear 21 in mesh with the gear 22, the striker-arm 80 will be in the position shown in Fig. 9, and during the movement of the drum element 56 to the dotted position there shown, will be contacted, causing the rod 73 to shift and, through the medium of the segment 74, the rod 38, and the fork 37, will shift the gear 21 out of engagement with the gear 22, the complete movement of the element 56 leaving the gears 21 and 23 in an intermediate position in which neither gears 21 nor 23 are engaged. Were the gear 23 engaged with the gear 24 by some previous movement of the drum element 56, the striker-arm 79 would then be in a position to be contacted by the drum element 56, and the gear 23 would, upon the movement of the drum element 56 to the dotted position, be withdrawn from engagement with gear 24, leaving the gears 21 and 23 in an intermediate position in which neither was engaged. In other words, irrespective of the position of the gears 21 and 23 at the start of the movement of the drum element 56, when the drum element 56 has moved to the dotted position indicated in Fig. 9, the gears 21 and 23 must stand in a central or neutral position, neither gear 21 nor 23 being engaged.

The rod 43 is provided with an arm 81 carrying a projecting pin 83. The arm 81, pin 83, rod 43 and fork 42 co-act with the drum element 56 for the shifting of the gear 19 into engagement with the gear 20. Should the axial position of the drum element 56 present a solid portion of the drum-shell to the pin 83, then during the movement of the drum element 56 from the dotted position to the position shown in Fig. 10, the drum element would contact the end of the pin, moving the rod 43 to the right and through the medium of the fork 42, thereby moving the gear 19 into engagement with the gear 20. The rod 43 likewise carries a striker-arm 82. During the movement of the drum element 56, as previously described, from the position shown in Fig. 10 to the dotted position shown in Fig. 10, the striker-arm 82 will invariably be contacted whenever the gear 19 is engaged with the gear 20. In such case, the gear 19 will invariably be moved out of engagement with the gear 20 through the medium of the rod 43 and the fork 42, and having been so moved, will remain in this position irrespective of the return movement of the drum element 56, unless, when the return movement takes place, the rotative position of selector drum element 56 is such that a solid portion of its surface is presented to the pin 82, in which case, upon the return of the drum element 56 from the dotted position to the position shown in Fig. 10, the gear 19 would again be moved back into engagement with the gear 20. In other words, the movement or translation of the drum element 56 from the position shown in Fig. 10 to the dotted position there shown, will invariably shift gear 19 out of engagement with the gear 20, should they be engaged, and will return the gear to engagement should the angular or rotative position of the drum element 56 be such that the pin 56 passes through one of the openings or holes provided for this purpose in the drum shell.

It will be noted above that the same holds true of the gears 21 and 23. In other words, the gears 21 and 23, upon translative movement of the drum element 56 toward its neutral position, will invariably be moved to a position of disengagement. Depending upon whether the pins 76 and 78 contact with the surface of the drum upon the return movement of the drum, or merely pass through the holes provided for this purpose in the drum, they will be left in a position of disengagement, or moved the one way or the other into engagement with the respective gears 22 and 24.

It will be apparent that by the means above explained, any one of the shiftable gear elements may be shifted in either direction by the movement of translation of the respective drum elements as controlled by the hand operable lever 49, accordingly as the drum elements are axially positioned by the means of the hand operable lever 63.

Figure 14:
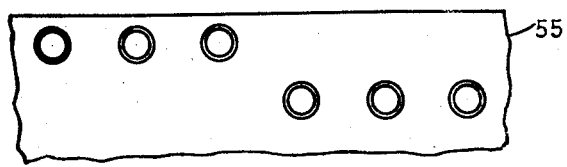
Figs. 14 and 15 are developed surfaces of portions of the gear shifting selectors.
Figure 15:
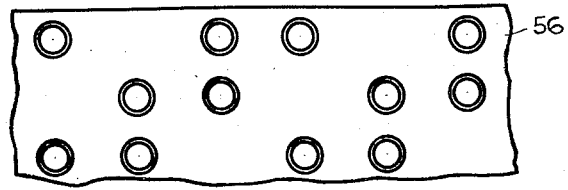

It will further be apparent that by suitable configuration of the respective drum shell, such, for instance as the provision of holes in drum shell 55 as shown by the development of the drum surface in Fig. 14, and by the provision of suitable holes in drum shell 56 as shown by the development of Fig. 15, the six different angular positions of the hand lever 63 may correspond, owing to the relationship of the parts, to the six possible arrangements of the shiftable gears.

If a suitable indicator is provided, the spindle speeds resulting from the various positions of the shiftable gears may then be indicated directly from the movement of the lever 63. A preferred form of such indicating means will now be described.

Figure 6:
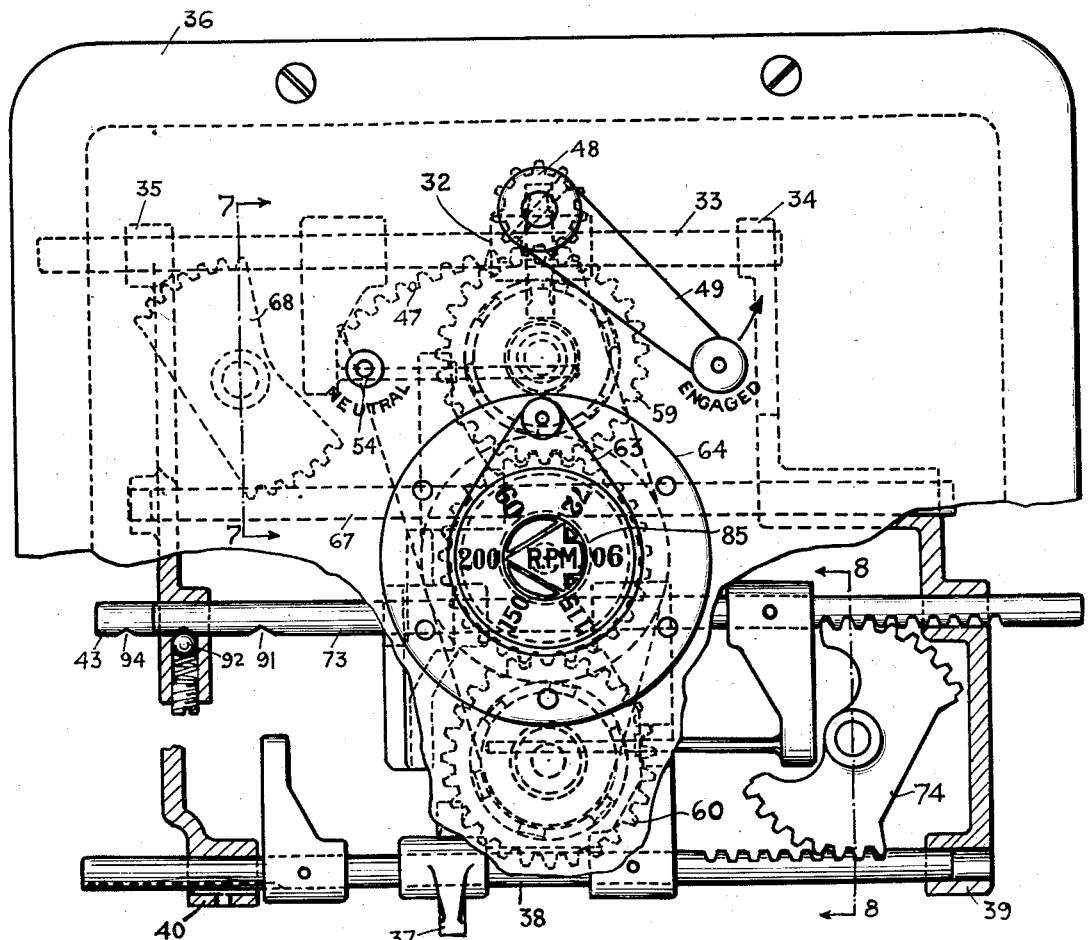
Fig. 6 is a detail view on an enlarged scale showing in side elevation the shifting mechanism illustrated in Fig. 1, portions of the plate or housing supporting such mechanism being broken away to expose the interior parts.
Figure 16:
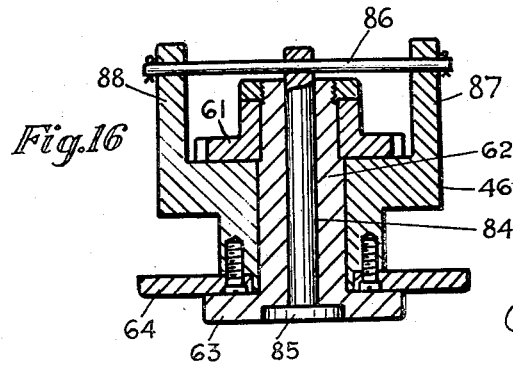
Fig. 16 is a section taken on line 16—16 of Fig. 4.

A rod 84 (Figs. 4 and 16) is provided upon the one end with a head 85 upon which is stamped, printed, or otherwise formed an indicator arrow as shown in Fig. 6. Passing through the other end of the rod 84 is a pin 86 which engages at its extremities, arms 87 and 88 on the member 46. The construction is such that the rod 84 is constrained to partake of the movement of the member 46 when such member is moved by the hand lever 49, as previously described, but is prevented from partaking of the rotative or angular movement of the member 62 when moved by the hand lever 63, although the rod is pivoted in the member 62. The hand lever 63 is enlarged to a circular form, as shown in Fig. 6, and thereupon are printed or stamped, or otherwise formed, numerals as there shown, corresponding to the various spindle speeds produced by the transmission train in its various positions, the position of the numerals being such that as the hand lever 63 is turned to its various angular positions (productive, as previously described of the various spindle speeds) the corresponding numerals will be successively passed before the point of the arrow or indicator provided on the head 85 of the rod 84, and for any given positioning of the movable gear elements as brought about by the angular movement of the hand lever 63, the spindle speed produced thereby must invariably be indicated by the position of the numeral in relation to the arrow or pointer, and even during the swinging movement of the member 46, which provides the movement of translation for the drum elements 55 and 56.

The significance and value of his arrangement will be best appreciated by those who understand that in machine tool practice and operation it is of great importance to be able to control with certainty the spindle speeds in accordance with the requirements of the work. There is usually such a multiplicity of speeds available as has heretofore required expect calculation or reference to tables to ascertain what combination of gears will be productive of the desired speeds. It will be understood, therefore, that it is a great advantage of the present mechanism to have the device so organized that the gear combinations are automatically engaged to produce a speed selected by the direct reading of the selector pointer showing an orderly source of graduated figures representing revolutions to be performed.

The operation productive of any given spindle speed is as follows, irrespective of which spindle speed may have been previously engaged.

The plunger 52 of the hand lever 49 is disengaged by means of the hand-grip 50, as previously described, and the hand lever 49 is swung from the engaged position shown in Fig. 6 in the direction of the arrow there indicated to the position marked "neutral" in Fig. 6 where a hole is provided for the plunger 52 with which the plunger is then engaged. Such a movement of the hand lever 49 invariably disengages the gears 19, 21 and 23, irrespective of which of the gears may previously have been engaged. The gears 26 and 27, however, are not moved regardless of their position of engagement.

The reason why gears 11, 21 and 23 are always disengaged and gears 26 and 27 are left in mesh will be apparent when it is remembered that there are but two gears on shaft 25, and these are connected together so that it is impossible for both to be in mesh simultaneously. On shaft 9, however, there are three gears, one of which has independent movement. If steps were not taken to ensure the disengagement of all of these gears each time the speed of the entire mechanism was changed, as occasion might arise in which one of the gears would not wholly move from mesh before another gear became engaged, whereby shafts 9 and 10 would be simultaneously connected at two different ratios and the consequent destruction of the gearing.

The drum elements 66 and 56 are now in a position disengaged from any of the pins which, if engaged, would prevent axial movement of the drum elements, and can therefore be swung to any of their axial positions. For this purpose the hand-grip 65 is now grasped to disengage the plunger of the hand lever 63, and the hand lever is moved in either direction until the numeral on the enlarged portion of the hand lever 63 which corresponds to the desired spindle speed coincides with the point of the indicating arrow on the head 85 of the rod 84. When this has occurred, the plunger of the hand lever 63 will then be positioned directly over one of the six holes provided in the index plate 64, and upon the hand-grip being released, the plunger will enter the hole, thus fixing the position of the drum elements 55 and 56 to a position productive of the desired spindle speed.

The plunger 52 is now disengaged by the means of the hand-grip 50 and the lever 49 is returned to the "engaged" position as shown in Fig. 4.

During such movement the drums have contacted with such of the various pins 70, 72, 76, 78 or 83, as will be productive of the movements required to shift the gear elements into the position productive of the speed indicated by the pointer. Furthermore, when the engaged position of the hand lever 49 has been reached, some of the pins will be engaged through the holes provided in the drum elements 55 or 56, and such engagement will provide an interlock or stop, preventing any movement of the hand-lever 63 until such time as the hand-lever 49 has again been shifted from the "engaged" to the "neutral" position. This will be apparent from Fig. 10 and Fig. 11 in which the position of the various pins is shown when the gears are in the position indicated in Fig. 5 productive of the spindle speed indicated in Fig. 4. It is to be noted that the gears 26—27 differ from the other gears in their relation to the interlock mentioned, in that gears 26—27 may remain in either position when the others are shifted to neutral for reasons explained. The interlock arrangement therefore is such that the other gears must be in a certain position, that is to say in a neutral position before the interlock permits lever 63 to rotate the drum elements, but the gears 26—27 may be in either position.

The gears 26 and 27 have only two positions when the train is operative, the one being when the gear 26 is engaged with the gear 24, and the other being when the gear 27 is engaged with gear 28. When the gear 26 is engaged with the gear 24, the hand lever 49 being in the engaged position, the drum element 55 stands in such relation to the point of the pin 70 and the extension of the arm 71 that the gears are fixed in position until such time as the hand lever 49 is moved to a neutral position and the drum 55 is caused to retreat from the position shown in Fig. 11. Were the gear 27 engaged with the gear 28, it will be apparent from the previous description that the point of the pin 72 and the extension of the arm 69 would then serve the same purpose of preventing the movement of the gears from such position until the lever 49 had been removed to a neutral position.

The gears 21 and 23 may have one of three positions during train operation, one being the position wherein the gear 21 is engaged with the gear 22, another being a position where gear 23 is engaged with gear 24, and still another being a neutral position in which neither of the gears are engaged and the gear pair stands central between the gears 22 and 24.

When the gear 21 is engaged with the gear 22, the point of the pin 78 and the extension of the arm 75 stand in such relation to the drum 56 that so long as the "engaged" position of the arm 49 is maintained, the gears may not move from the described position. In other words, the gears may not move until the lever 49 has been moved to a neutral position and the drum 56 has thereby been caused to retreat from the position shown in Fig. 11. Should the gears be in the position of engagement with the gear 23 engaged with the gear 24, it will be apparent from previous description that the point of the pin 78 and the extension of the arm 77 would act in a similar manner to prevent movement of the gears 21 and 23 until such time as a movement of the arm 49 had caused the retreat of the drum 56. When the gears 21 and 23 stand in a neutral position, or in other words, if after having shifted to a neutral position by the movement of the drum element 56 previously described they are permitted to remain in this position when the hand-lever 49 is returned to the engaged position, the positions of the pins 76 and 78 and the arm extensions 75, 77 and 79 and 80 in relation to the drum element 56, is as shown in Fig. 12. When in such position, there is no interference of parts as previously described for the gears 21 and 23 which would tend to retain the gears in the desired position, and for this reason other means is provided. The rod 73 is provided with a notch 91 adapted, when the gears are in the neutral position described, to be engaged by a spring pressed ball 92, the pressure of the spring pressed ball being sufficient to form a detent and retain the various parts movable with the rod 73, including the gears 21 and 23, in the position corresponding to the neutral position of the gears.

Figure 5:
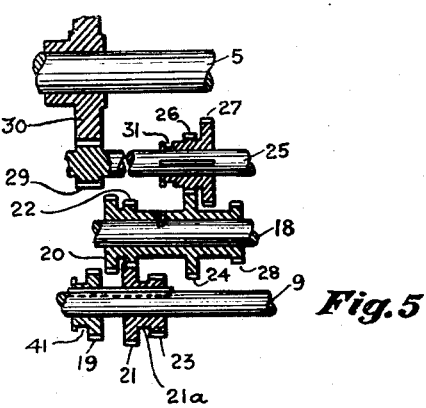
Fig. 5 is a detail view on the same scale as Fig. 1, taken on the section indicated by line 5—5 in Fig. 4.

When the gear 19 is in the position of disengagement, as shown in Fig. 5, the pin 83 and arm extensions 81 and 82, are in the position shown in Fig. 11. When the gear 19 is in the position of engagement with the gear 20, the pin 83, the arm extension 82, and the drum 56 stand in the relationship shown in Fig. 12. To retain the gears in the respective positions just described, the rod 43 is provided with notches 93 and 94, which are so positioned in their relationship to a spring pressed ball 95, that when in the one position the ball will enter the notch 93, and when in the other position the ball will enter the notch 94. In either instance, since the gear is constrained to maintain a position corresponding to the position of the rod 43, the detent thus provided will retain the gear in the desired position until such time as it is forced to move from this position by means previously disclosed.

It is desirable that the engagement of the gearing should take place in a certain order relative to the driving end of the resulting train. If an attempt were made to engage either of gears 26 or 27 with the gears of the intermediate shaft at a time when that shaft was idle, it might then happen that tooth edges of the gear 26 or 27, as the case might be, would strike flat surfaces on tooth edges of the gears 24 or 28, and in consequence of the non-rotation of the gears involved no engagement would be possible. To prevent this, it is so provided, as will be later described, that which ever of the gears 19, 21, or 23 is shifted to provide the desired spindle speed, such gears will invariably enter into their engagement before movement, if any of the gears 26 or 27 toward positions for engagement, the result being that no gearing of the train can shift under conditions such that both of the gears about to be engaged will be non-rotating. This, together with provisions of means for shifting the gears positively, ensures against sticking.

It is further desirable, in order to promote compactness of the mechanism, that certain of the gears of the train should have only such movement provided as may be necessary to provide proper functioning of the train, irrespective of greater movement required of other gears; for instance, that the gear 19 may move only the amount required to disengage it from the gear 20, although the gear 27 must be moved a sufficient amount to disengage it with gear 28, and a further amount sufficient to engage the gear 26 with the gear 24.

I will now explain the means whereby the movement of certain elements is reduced in proportion to other elements while still insuring that no gear pairs will be engaged when both of the engaging gears are non-rotative.

When the gear 19 is in the engaged position, the pin 83, drum element 56, and striker arm 82 stand in the relative position shown in Fig. 12. Should the lever 49 now be moved toward the neutral position indicated in Fig. 6 the drum element 56 will travel toward the left of Fig. 12 and during a certain portion of such movement, will not move the gear 19 from its position of engagement because of the spacing provided between the drum element 56 and the striker-arm 82 as there shown, the relation of the parts and the spacing provided being such that the complete movement of the drum element 56 corresponding to the movement of the lever 49 from the engaged to the neutral position indicated in Fig. 6 will move the gear 19 a sufficient amount to just engage it from the gear 20. Should the drum element 56 be now axially shifted to produce a spindle speed requiring a shifting of the gears 26 and 27, and a re-engagement of the gear 19 with the gear 20, the drum element 56, during its engaging travel, will immediately start to move the gears 26 and 27, since no lost motion is provided in their actuating mechanism but the drum would not start to move the gear 19 until the lost motion or existing space between the drum element 56 and the pin 83 had been traversed. However, since the gears 26 and 27 must travel a considerable distance to disengage the one gear before the other gear is engaged, the space between the point of the pin 83 and the arm extension 72 may be and is so porportioned in relation to the drum diameter 56, that the pin 83 will be contacted sufficiently prior to the time of engagement of gears 26 and 27 that the gear 19 will be engaged a sufficient amount with the gear 20 to provide rotative movement for the gears 24 and 28 before the start of the engagement of the gears 26 and 27.

Should either of the gears 21 and 23 be engaged and the lever 49 then be moved to a neutral position, as previously described, the drum 56, during its corresponding movement, will move a certain distance as indicated in Fig. 11, before contacting the respective striker-arms 79 and 80. The position of the parts shown in Fig. 11 corresponds to an engagement of the gear 21 with the gear 22, and it will be apparent that upon the movement of the drum 56 to the left in Fig. 11, a certain movement of the drum would take place before the drum contacts the striker-arm extension 80 to move the gears 21 and 23.

Should the gears 23 and 24 be engaged, a similar relationship and similar delay would exist before the drum 56 contacted the striker-arm extension 79. In either instance, although an interval would elapse before the gears were moved, the relationship of the parts is such that the completion of the movement of the lever 49 to the neutral position would carry the gears 21 and 23 to a neutral position, only sufficient movement of the gears being provided because of the lost motion just described to permit the gears to clear the mating gears 22 or 24.

Should the hand-lever 63 now be moved angularly to correspond to a desired spindle speed which requires a shifting of the gears 26 and 27 and a re-engagement of one of the gears 21 and 23, it will be apparent that the gears 26 and 27 will start the required movement immediately upon the start of the return movement of the lever 49 to the engaged position, no lost motion being provided in their actuating mechanism because these gears move directly from an engaged position of the one to the engaged position of the other, and consequently have such a distance to move that all of the effective movement of the shifter is required.

Before the gears 21 and 23 start to move into engagement however, an interval will elapse because of the lost motion provided the pins 76 and 78 and the striker arms 79 and 80 being so spaced that when the gears 21 and 23 are in neutral position, a greater space exists between the arms 79 and 80 and the points of the pins 76 and 78 than will be filled by the diameter of the drum 56. The gears 27 and 26, however, must move a considerable distance to disengage the one gear before the other gear starts to engage and the proportioning of the parts is such that before such engagement starts, the excess of space between the drum surface and the points of the pins 76 and 78 has been taken up by the movement of the drum and one or the other of the pins has been contacted by the drum and the gear 21 or 23, as the case may be, has been moved into partial engagement, sufficient to provide rotative movement for the gears 24 and 28. In the same manner, if the gear 19 instead of one of the gears 21 or 23 is to be engaged it will engage prior to the engagement of either of the gears 26 and 27.

For the normal requirements of strength, the gears 19, 21 and 23 might be made of the same width as the gears 26 and 27, or even of lesser width; however, to provide for engagement of the gears 19, 21 and 23 at the proper instant relative to the engagement of the gears 26 and 27, the gears 18, 21 and 23 have been made of different width of face than would otherwise be required; in this particular instance being of wider face in order that when engaging they may engage prior to the engagement of the gears 26 or 27 and may then continue to move at a rate corresponding to the rate of the gears 26 and 27, and may continue their travel as long as the gears 26 and 27 continue to move, without exceeding positions of full mesh.

Maximum shifter movement is proportioned or determined for the gears 26, 27 since these have greatest movement of engagement. Since the gears 19, 21 and 23 require less movement lost motion is provided, but not so much but that the last mentioned gears will invariably engage before the gears 26, 27 for reasons stated, and the width of face of either the gears 19, 21 and 23 or their mating gears is increased to avoid moving past a position of maximum engagement which might otherwise happen if they were engaged before the gears 26 and 27 and continued to move until the gears 26, 27 were fully engaged.

It will be understood that all the above described structure is capable of great modification. It is, in fact, intended to be merely representative of the various different operations which may be effected through the use of control mechanism embodying my invention. In order further to emphasize the advantages of a drum which, during its bodily movement, engaged the gear shifting pins along lines radial with respect to the axis of rotation of the drum, I have shown in Fig. 17 a view similar to Fig. 4 but modified in that the drum 56' is longer than drum 56 illustrated in Fig. 4 and serves to shift additional gearing. For the purpose of Fig. 17 it may be assumed that power is supplied to the gear shifting mechanism in the first instance through shaft 100 instead of shaft 9. Shaft 9 and shaft 101 thereupon become intermediate shafts similar to shaft 18 in the embodiment of the invention originally described. Shaft 9 in addition to having the gears already described will be provided with a relatively fixed gear 102 with which a gear 103 slidable in splined relation to shaft 101 is adapted for mesh. A fork 104 for shifting gear 103 is mounted on a slidable rod 105 having an arm 106 projecting into operative relation to the extended drum 56' and there provided with a pin similar to those already described. A rod 107 is so interconnected with rod 105 as to be slidable oppositely with respect thereto, just as shafts 38 and 73 are interconnected for opposite movement. Shaft 107 has a depending arm 108 which is likewise provided with a pin in operative relation to a drum 56' so that the drum may act either through arm 106 or through arm 108 to shift gear 103 into or out of mesh with gear 102.

In a similar manner the transmission of power from shaft 100 to shaft 101 through a sliding gear 110 may be controlled through a fork 111 mounted on one or two interconnected sliding rods 112 and 113 carrying arms 114 and 115, respectively. From the foregoing it will be obvious that by merely extending the length of the drums of this device it is possible to multiply indefinitely the number of gear shifting movements controllable by a single drum selector although in certain instances it is preferable to use the two drums for the purpose of reducing the space occupied by the selector mechanism in an axial direction.

From the foregoing description it will be apparent that a plurality of transmission mechanisms consisting of a first set of gears or elements including gear 19, and the unitary pair of gears 21 and 23 shiftable to interchangeably transmit power from shaft 9 to shaft 18, and a second set of gears or elements including gears 26 and 27 forming a unitary pair and shiftable to interchangeably transmit power from shaft 18 to shaft 25, are arranged in series for one set to receive power from the other, and each of the shiftable elements has a power-transmitting and a non-power-transmitting position, whereby a variety of speeds may be made effective on the spindle 5 from a constant speed shaft 9.

Also that the levers 49 and 63 together with various parts movable therefrom form a selective shifting device for the direct positioning of any of the shiftable elements into power transmitting positions whereby from suitable lever manipulation choice may be made of a desired speed rate from a chart or index upon which all available speed rates are arranged in numerical order and the gears productive of such a speed may be directly shifted to produce that speed and no other, and as long as the speed indicating portion remains in a position indicative of any given speed only that speed may result.

Also that the movement of elements or gears to produce a given speed may, by the organization here shown be the least possible, for although a gear set having independently movable and interchangeably power-transmitting positions as the set consisting of the gears 19, 21 and 23 requires that all the gears be moved to neutral or non-power-transmitting positions prior to the movement of engagement of any of such gears yet it is possible and contemplated that speed change mechanism may be used in which all of the serially arranged gear sets might be of the type represented by the gears 26, 27 and in which no two gears of any set could be simultaneously in power-transmitting positions, in which case all gear movements would be movements of engagement and all gears required in power transmitting positions for a new rate, would be retained in previous power-transmitting positions.

Also that for gear sets having a plurality of gears separately or independently movable to interchangeably transmit power, as the gears 19 and 21 or 19 and 23, mechanism is provided whereby all such gears will be invariably moved to a neutral position during a portion of the cycle of movement of the control device by the portions 83, 80 and 79 respectively complementary to the respective gears, irrespective of which of such gears may be previously engaged.

And that in a variable speed transmission mechanism having a multiplicity of shiftable transmission elements, any one of which is movable to power-transmitting and to non-power-transmitting positions, a control device is provided for simultaneously actuating any desired plurality of such elements into power-transmitting positions directly and selectively and without the necessity of shifting any element into undesired power-transmitting position.

Also that for a transmission train having a plurality of sets of gears each of which includes a plurality of gears shiftable to interchangeably transmit power, a control device is provided with a visible chart or indicator, and so arranged that in order to move the indicator from a position corresponding to the speed actually produced the train will be rendered inactive and will remain so until the gears productive of the indicated speed are engaged.

Having now completely revealed my invention, I claim:

1. In a transmission and control mechanism for machine tools, the combination with rate changing mechanism including a plurality of shiftable rate change elements, of a plurality of shifters respectively connected for movement with the respective elements, and a selector mounted for oscillatory movement in a position to contact and move said shifters, said selector being mounted for rotation about an axis transverse to the direction of its oscillatory movement and being formed to engage different of said shifters when oscillated in different positions of rotative adjustment.

2. In a transmission and control mechanism for machine tools, the combination with rate changing mechanism including shiftable elements, of a plurality of shifters connected with respective of said elements, an oscillatable carrier, a selector rotatably mounted on said carrier in a position to engage and adjust said shifters during an oscillation of said carrier, said selector being formed to engage different of said shifters in different positions of rotative adjustment, and a control handle operatively connected with said selector and having an axis of movement located substantially concentrically with the axis of oscillation of said carrier.

3. In a transmission and control mechanism for machine tools, the combination of a plurality of sets of change speed mechanism connected in serial relation and each including a plurality of shiftable rate varying elements whereby their combined result is the product of rate changes as affected by the positions of said elements in each such mechanism, a plurality of shifters respectively connected for movement with elements of the respective change speed mechanisms, and an actuating device having an adjustable portion formed with a surface adapted in one part to abut both of said shifters and in another to avoid contact with one or the other thereof in accordance with the predetermined positions of adjustment of said portion, whereby said actuating device may act simultaneously or separately to shift an element of each of said mechanisms.

4. In a transmission and control mechanism for machine tools, the combination with rate changing mechanism including a plurality of shiftable rate change elements, shifters connected for movement with individual of said elements and a drum mounted for bodily movement to contact and move said shifters and for rotation on an axis transverse to said bodily movement, said drum having a peripheral configuration adapting it in various positions of rotative adjustment to act upon selected of said shifters without acting upon another shifter and being thereby adapted during bodily movement for peripheral contact with predetermined shifters according to its position of rotative adjustment.

5. In a transmission and control mechanism for machine tools, the combination with a rate changing mechanism including a pair of shiftable elements connected together for adjustment as a unit in the one or the other direction to a plurality of effective element positions in such mechanism, of a plurality of shifter members operatively connected with said unitary pair of elements, each member being adapted to move said pair in one of said directions to a given effective position in said mechanism, and a rotatable drum bodily movable for contact with selected shifter members in substantially the direction of its radius and having a peripheral configuration determinative of the member with which such drum contacts, the rotation of said drum being adapted to cause it to contact with the one or the other of said members when moved bodily and thereby selectively to actuate the respective elements of said pair directly to their required positions.

6. In a transmission and control mechanism for machine tools, the combination with rate changing mechanism including a plurality of shiftable elements, of shifters operatively connected with said elements and provided with projecting pin portions, said shifters being adapted when one of said pin portions is contacted to move a particular element to a single predetermined operative position in said mechanism, a drum having apertures in its periphery and mounted for rotative and for bodily movement in opposite directions, one of the directions of its bodily movement being such as to bring unapertured portions of its periphery into substantially radial contact with pin portions of selected shifters, the apertures in said drum being so disposed as to receive the pin portions of different shifters in various positions of rotation of said drum; and means for the rotative and bodily movement of said drum.

7. In a transmission and control mechanism for machine tools, the combination with rate changing mechanism including a plurality of shiftable elements, of shifters for said elements including pin portions in substantial alignment and each adapted to move its respective element to a single given operative position in said mechanism, of a drum having an axis substantially parallel to the alignment of said pin portions and being mounted for rotation on said axis and for bodily movement in the direction of said pin portions, whereby to contact selected portions of its periphery, said drum having portions of its periphery cut away whereby to avoid contact with selected pin portions, the pin portions contacted during such bodily movement being operated to actuate specific elements into a predetermined combination in accordance with the position of rotation of said drum, and means for the rotation and bodily movement of said drum.

8. In a transmission and control mechanism for machine tools, the combination with rate changing mechanism including a plurality of shiftable elements, of shifters operatively connected with individual elements and provided with projecting pin portions, each of said shifters being adapted when said pin portion is contacted to move its respective element to a single predetermined operative position in said mechanism, a carrier mounted for oscillatory movement and provided with a manually engageable handle portion for its adjustment, and a selector mounted on said carrier for rotation about its own axis and in a position for movement about the axis of oscillation of said carrier in contact with the pin portions of selected shifters in accordance with the rotative position of said selector, said selector having a configuration adapting it to engage the pin portions of different shifters when it is in different positions of rotative adjustment and the manual oscillation of said carrier in one direction being adapted to effect the shifting of elements connected with shifters engaged by said selector.

9. In a transmission and control mechanism for machine tools, the combination of an oscillatory carrier and a gear shifting selector mounted on said carrier for movement about the axis of oscillation thereof and for an independent rotary movement about a different axis, shifters positioned to be acted on by said selector in one direction of oscillation of said carrier, said selector being configured for contact with different shifters in its various positions of rotative adjustment about said different axis, and rate changing mechanism including a plurality of shiftable elements operatively connected with respective shifters to be adjusted thereby into operative positions in said mechanism.

10. In a transmission and control mechanism for machine tools, the combination of an oscillatory carrier, a gear shifting selector mounted on said carrier for movement about the axis of oscillation thereof and for an independent rotary movement about a different axis, shifters positioned to be acted on by said selector in one direction of oscillation of said carrier, said selector being configured for contact with different shifters in its various positions of rotative adjustment about said different axis, rate changing mechanism including a plurality of shiftable elements operatively connected with respective shifters to be adjusted thereby into operative positions in said mechanism, and means substantially concentric with the axis of oscillation of said carrier for the rotative adjustment of said selector on said carrier.

11. In a transmission and control mechanism for machine tools, the combination of a plurality of shifters each adapted to adjust a movable element of a rate changing mechanism, a carrier having advanced and retracted positions, a drum movable with said carrier and adapted in moving toward its advanced position to contact selected shifters and transmit movement thereto, said drum being rotatively adjustable to select shifters to be engaged thereby and an interlock including a part positioned to engage with said drum during movement from the one to the other of said positions, whereby rotative drum movement is prevented except when said carrier is in its retracted position.

12. In a transmission and control mechanism for machine tools, the combination of a plurality of shifters each adapted to adjust a movable element of a rate changing mechanism, a carrier having advanced and retracted positions and a drum having apertures and movable with said carrier and adapted in moving toward its advanced position to contact selected shifters and transmit movement thereto; said drum being rotatively adjustable to select shifters to be engaged thereby, and said shifters being provided with pins normally aligned in the path of movement of said drum and individually receivable in certain of said apertures, whereby to interlock said drum against rotation when received therein.

13. In a transmission and control mechanism for machine tools, the combination with a power train including a plurality of unitary pairs of speed change elements each shiftable to a plurality of effective positions in said train, shifting means for said pairs and alternatively movable in opposite directions and including connections operative in one direction of said movement to shift one of said pairs directly from one of said positions to the other, and other connections operative during the same direction of movement to shift the other of said pairs from one of said positions to an inoperative position, said shifting means including selecting means adjustable to determine the effect of said shifting means on said pairs during the other direction of movement of said shifting means, means connected for movement with said selecting means for visibly indicating the position of adjustment of said selecting means and an interlock including parts one of which is connected to be engaged and disengaged with the other by the opposite movement of said shifting means.

14. In a transmission and control mechanism for machine tools, the combination with a plurality of change speed devices including shiftable elements, of independent shifters for said elements including a plurality of sets of aligned pins each connected with one of said shifters, an actuator including bodily movable portions positioned to engage selected of said pins during such movement and formed and mounted for rotative adjustment determinative of the pins to be so engaged, said portions being interconnected for simultaneous movement, and one of said portions being formed for interlocking interaction with one of said pins in a certain position of one of said elements, whereby to secure said actuator against selective adjustment when said element is in said position.

15. The combination with a transmission mechanism for machine tools and including shiftable change speed elements, of shifting mechanism therefor including a plurality of independently operable shifters adapted to act upon respective of said elements, said shifters being provided with normally aligned pin portions, and a drum rotatable on an axis substantially parallel with the aligned pin portions and having an actuating movement to contact with said portions in a direction substantially corresponding to a radius of said drum, said drum being apertured to receive different pins during its actuating movement when in its different positions of rotation, whereby to determine for each such position what combination of pins will be actuated thereby, said drum being secured against rotation when a pin enters an aperture therein.

16. In a transmission and control mechanism for machine tools, the combination of a plurality of transmission shafts, a plurality of shiftable rate change elements adapted in certain positions of their movement to connect said shafts in serial power transmitting relationship, and a control device shiftable for simultaneously shifting said elements and including different motion transmitting trains for engagement of the respective elements, one of said trains including parts having lost motion, whereby the element affected by the last named train is engaged at a later interval than the other of said elements.

17. In a transmission and control mechanism for machine tools, the combination with a power train including driving, intermediate and driven shafts and a plurality of elements respectively shiftable to establish an operative motion transmitting connection between different pairs of said shafts and a control device shiftable for simultaneously shifting said elements and including different motion transmitting trains for engagement of the respective elements, the train for shifting the element to connect said intermediate and driven shafts including parts having lost motion, whereby the other element will be first engaged and the intermediate shaft will be set in motion before the engagement of said element connecting the intermediate and driven shafts.

18. In a transmission and control mechanism for machine tools, the combination with a driving shaft provided with means for operating it at a substantially constant known number of revolutions per minute, of a driven shaft required to be operated at a plurality of different known rates of rotation, change speed gearing interconnecting said shafts and including a plurality of shiftable elements adapted in their various positions to provide for a plurality of different serial combinations productive of various changes in rate between the driving and driven shafts, means for selectively shifting each of said elements directly to its required position for effecting any desired serial combination aforesaid and including a device having separate selective adjustment and shifting movement, an adjustor operatively connected with said device to control the selective adjustment thereof and provided with a pointer, together with a scale relatively fixed and comprising a substantially consecutive list of the various rates of rotation per minute adapted to be effected in said driven shaft in the various positions of said elements, whereby said pointer is movable in orderly manner with reference to the associated scale to indicate directly in revolutions per minute all rates from the lowest to the highest at which said driven shaft may be operated and whereby said device will selectively shift directly to their required positions and without passing through intermediate positions any elements required to produce the rate indicated by the pointer.

19. In a transmission and control mechanism for machine tools, the combination of a power train including driving, intermediate and driven shafts, a group of elements alternatively engageable for connecting the driving and intermediate shafts, a second group of elements alternatively engageable for connecting the intermediate and driven shaft, a gear shifter for said elements including a selector portion adjustable to determine the engagement of all of said elements, and motion transmitting connection from said shifter to one of said groups and operative to disengage the elements thereof in accordance with the adjustment of said selector portion, and from said shifter to the other of said groups and operative to disengage the elements thereof independently of the adjustment of said selector portion.

20. In a transmission and control mechanism for machine tools, the combination with a power train including a driving shaft, an intermediate shaft and a driven shaft, of gearing connecting said shafts including a unitary pair of gears shiftable directly between alternative operative positions for power-transmission between two of said shafts, a second unitary pair of gears shiftable between operative positions for power transmission between a different two of said shafts and having a neutral position, a control device mounted for gear shifting and retractive movements and having an adjustable portion determinative of the gear or gears to be shifted, together with motion transmitting connections adapted to impart motion to selected gears for the shifting thereof during the shifting movement of said device, said connections being adapted to shift said second gear pair to its neutral position during the retractive movement of said device while leaving said first mentioned gear pair in one of its operative positions.

21. In a transmission and control mechanism for machine tools, the combination with a power train including a speed change element shiftable to and from a power-transmitting position, of a control device associated with said power train and including a shifter portion movable through a predetermined cycle of movement and a selector portion adjustable to determine whether or not said shifter portion will move said element during said cycle, and motion transmitting means adapted to receive motion from said device during said cycle and including parts acting positively upon said element when said selector portion is in certain positions of adjustment to move said element to its power-transmitting position during one portion of said cycle and from its power-transmitting position in another portion of said cycle.

22. In a transmission and control mechanism for machine tools, the combination with a power train including a unitary pair of speed change elements having a neutral position and adjustable therefrom to either of two alternative power-transmitting positions, of a control device including a shifter portion movable in a predetermined cycle for the shifting of said pair of elements, and a selector portion adjustable to determine to which of said positions said pair is to be shifted, together with motion transmitting connections adapted to impart to said pair the positive motion of said shifter portion in a direction determined by said selector portion, said connections including parts positively operative upon said pair to restore it to its neutral position during a part of said cycle irrespective of the adjustment of said selector portion.

23. In a transmission and control mechanism for machine tools, the combination with a power train including a plurality of shiftable transmission elements, of a control device having a selector portion and a shifter portion, the latter being movable in a cycle, and motion transmitting connections complementary to said selector portion and cooperating therewith during a part of said cycle to shift one of said elements irrespective of the position of said selector portion and during the remainder of said cycle to shift any one or more of said elements in accordance with the position of said selector portion.

24. In a transmission and control mechanism for machine tools, the combination with a power train including a shiftable element, of a slide connected with said element for the shift thereof and provided with projecting arms, and a selector comprising a movable support and an apertured drum mounted on said support for bodily movement therewith and for selective adjustment upon its axis, one of said arms being formed to contact with said drum irrespective of the rotative adjustment thereof and the other of said arms being provided with a pin adapted in a predetermined position of adjustment of said drum to enter an aperture therein, whereby to avoid the reception of motion therefrom.

25. In a transmission and control mechanism for machine tools, the combination with a power train including a shiftable element, of a slide connected with said element for the shift thereof, and provided with projecting arms, and a selector comprising a movable support, and an apertured drum mounted on said support for bodily movement therewith and for selective adjustment upon its axis, one of said arms being formed to contact with said drum irrespective of the rotative adjustment thereof and the other of said arms being provided with a pin adapted in a predetermined position of adjustment of said drum to enter an aperture therein, whereby to avoid the reception of motion therefrom, said arms being disposed upon opposite sides of said drum in the direction of movement thereof and being so spaced with reference to the diameter of said drum that said first mentioned arm is placed in the path of movement of said drum only subsequent to the interaction of the drum with said second mentioned arm.

26. In a transmission and control mechanism for machine tools, the combination with rate changing mechanism including a shiftable element, of a shifter connected with said element, and an actuating device for said shifter including a bodily movable selector rotatable about its own axis and having a configuration adapting it to contact in a certain position and not to contact with said shifter in another position of rotative adjustment, said device being so mounted that selector contact with said shifter will be substantially radial with respect to said axis.

27. In a transmission and control mechanism for machine tools, the combination with rate changing mechanism including a plurality of shiftable elements, of a shifter having portions individual to each of said elements, and a selector mounted for bodily movement in a direction to operate said shifter portions, said selector being rotatable on a given axis and adapted to contact selected shifter portions in a direction substantially radial with respect to said axis, said selector having a configuration adapting it to abut a different plurality of shifter portions in its different positions of rotative adjustment for the direct actuation of each shiftable element to its required position.

28. In a transmission and control mechanism for machine tools, the combination with change speed mechanism including shiftable elements, of shifting means including a plurality of pins respectively shiftable for power engagement of respective elements, an actuator including bodily movable portions positioned to engage and shift selected pins during such movement and formed and mounted for rotative adjustment about an axis transverse to the path of pin movement and determinative of the pins to be so engaged.

29. In a transmission and control mechanism for machine tools, the combination with a plurality of shiftable change speed elements, of shifters provided with normally aligned pin portions individual for power engagement of respective elements and a bodily movable drum rotatable on an axis substantially parallel with the aligned pin portions and having an actuating movement to contact with said portions in a direction substantially corresponding to a radius of said drum, said drum being apertured to receive different pins in its different positions of rotation, whereby to determine for each such position what combination of pins will be actuated thereby.

30. In a transmission and control mechanism for machine tools, the combination of a rate changer including shiftable elements, a member movable for the shifting of said elements, a selector mounted on said member for selecting elements required to be shifted and directions of shift thereof, a handle member connected with said selector for the adjustment thereof, a scale indicative of handle positions and associated with one of said members, and a pointer associated with the other of said members and adapted to co-operate with said scale, whereby said pointer and scale are simultaneously movable when said first mentioned member is moved and are relatively independently movable when said handle is adjusted.

31. In a transmission and control mechanism for machine tools, the combination with an oscillatory carrier, of a drum rotatably mounted thereon, a support for said carrier, a member connected with said carrier and projecting through said support, a second member operatively connected with said drum for the rotative adjustment thereof and extending through said support, a scale mounted on one of said members, and a pointer mounted on the other of said members, said scale and pointer being operatively associated to indicate the various rotative positions of said drum.

32. In a transmission and control mechanism for machine tools, the combination with an oscillatory carrier, of a drum rotatably mounted thereon, a support for said carrier, a member connected with said carrier and projecting through said support, a second member operatively connected with said drum for the rotative adjustment thereof and extending through said support, a scale mounted on one of said members, a pointer mounted on the other of said members, said scale and pointer being operatively associated to indicate the various rotative positions of said drum, a driving shaft operated at a constant speed, a driven shaft, rate changing gearing interconnecting said shafts and including shiftable elements, and shifters complementary to said drum and adapted to be acted upon thereby during the movement of said carrier in accordance with the rotative adjustment of said drum, each of said shifters being connected with one of said elements and adapted to shift respective elements directly to required position upon the occurrence of carrier movement, said scale giving a direct reading in consecutive series of the various rates of rotation produced on said driven shaft by the different element positions.

33. In a transmission and control mechanism for machine tools, the combination with a suitable support, of a carrier journaled for oscillation therein, a drum rotatably mounted on said carrier at a point remote from the axis of oscillation of said carrier, a shifter positioned in the path of movement of said drum upon the oscillation of said carrier, and a change speed gear connected with said shifter.

34. In a transmission and control mechanism for machine tools, the combination with a suitable support, of a carrier journaled for oscillation therein, a drum rotatably mounted on said carrier at a point remote from the axis of oscillation of said carrier, a shifter positioned in the path of movement of said drum upon the oscillation of said carrier, and a change speed gear connected with said shifter, said shifter including a contact portion and said drum having peripheral configurations adapting it in certain positions of rotative adjustment to receive said portion without acting thereon.

35. In a transmission and control mechanism for machine tools, the combination with an oscillatory carrier, of a pair of drums rotatably mounted thereon on opposite sides of the axis of oscillation of said carrier, means for simultaneouly adjusting said drums rotatively, and a group of shifters each having a portion disposed in the path of one of said drums and adapted selectively to be acted upon by said drums during the oscillation of said shifter in accordance with the position of rotation of said drums.

36. In a transmission and control mechanism for machine tools, the combination with an oscillatory carrier, of a pair of drums rotatably mounted thereon on opposite sides of the axis of oscillation of said carrier, means for simultaneously adjusting said drums rotatively, and a group of shifters each having a portion disposed in the path of one of said drums and adapted selectively to be acted upon by said drums during the oscillation of said shifter in accordance with the position of rotation of said drums, together with a change speed mechanism including a plurality of shiftable rate change elements, each of said shifters being connected for movement of a particular element in a particular direction.

37. In a transmission and control mechanism for machine tools, the combinations with a plurality of rate changing mechanisms arranged in serial relation and each including a unitary pair of elements shiftable to a plurality of operative positions, whereby to produce a variety of changes of rate through the combined effect of said elements in the various positions, of an oscillatory carrier, apertured drums mounted on said carrier upon either side of the axis of oscillation thereof, a shifter associated with each drum, each of said shifters being connected to a particular pair of elements in different mechanisms aforesaid and having portions individual for one or the other of the operative positions of the pair, and means for simultaneously rotatively adjusting said drums upon said carrier, said drums and shifter portions having complementary constructions, whereby the rotative adjustment of said drums is determinative of the shifter portions to be engaged thereby.

38. In a transmission and control mechanism for machine tools, the combination with a carrier having a hub and oscillatory about the axis thereof, of drums rotatively mounted on said carrier on opposite sides of said axis, a gear concentric with said axis and intergeared with each of said drums, and a shaft extending through said hub and connected with said gear to control the rotative adjustment of said drums.

39. In a transmission and control mechanism for machine tools, the combination with a drum mounted for bodily oscillatory movement and for rotative adjustment on its axis, of slides located upon either side of the axis of said drum, arms projecting from said slides, pins mounted in said arms and substantially aligned in parallelism with the axis of said drum, and means interconnecting said slides for opposite movement, said drum having a configuration adapting it during its oscillatory bodily movement to contact in a substantially radial direction either of said pins alternatively while avoiding contact with the other in accordance with its position of rotative adjustment, whereby according to such adjustment motion is transmitted from said drum to said slides to move them in the one direction or the other.

40. In a transmission and control mechanism for machine tools, the combination with a drum mounted for bodily oscillatory movement and for rotative adjustment on its axis, of slides located upon either side of the axis of said drum, arms projecting from said slides, pins mounted in said arms and substantially aligned in parallelism with the axis of said drum, and means interconnecting said slides for opposite movement, said drum having a configuration adapting it during its oscillatory movement to contact in a substantially radial direction either of said pins alternatively while avoiding contact with the other in accordance with its position of rotative adjustment, whereby according to such adjustment motion is transmitted from said drum to said slides to move them in the one direction or the other, together with a rate changing mechanism including a shiftable element connected with one of said slides to receive movement in one direction or the other therefrom.

41. In a transmission and control mechanism for machine tools, the combination with a drum mounted for bodily oscillatory movement and for rotative adjustment on its axis, of slides located upon either side of the axis of said drum, arms projecting from said slides, pins mounted in said arms and substantially aligned in parallelism with the axis of said drum, and means interconnecting said slides for opposite movement, said drum having a configuration adapting it during its oscillatory movement to contact in a substantially radial direction either of said pins alternatively while avoiding contact with the other in accordance with its position of rotative adjustment, whereby according to such adjustment motion is transmitted from said drum to said slides to move them in the one direction or the other, together with a rate changing mechanism including a shiftable unitary pair of elements connected with one of said slides to receive movement in one direction or the other therefrom, and to be moved thereby to alternative power-transmitting positions, one of said slides having a second arm adapted in certain positions of said slides to lie in the path of retractive movement of said drum and adapted to be contacted by said drum irrespective of the position of rotation of said drum, whereby to shift said pair of elements to a neutral position.

42. In a transmission and control mechanism for machine tools, a power train having selectively shiftable speed change elements, a device movable for selection of said elements, a device movable for simultaneously shifting a plurality of the elements selected by the first named device, and means preventing the movement of the first named device while the other of said devices is in certain of its positions of movement.

43. A transmission mechanism for machine tools having a plurality of gears shiftable to interchangeably transmit power, in combination with a control device including a first-hand lever, a portion movable from said lever for selection of a gear to be shifted, a second hand lever, positive motion transmitting connections from said second lever and operatively connectible to positively shift the one or the other of said gears in accordance with the position of said portion, and a speed indicating device having a portion connected for movement from said first lever.

44. In a machine tool transmission having a first and second gear set, each having a plurality of gears shiftable to interchangeably transmit power and connected for one set to receive power through the other, the combination of a selective device including a first hand lever and a portion adjustable from said lever for selection of a gear or gears to be shifted, and shifting means including a second hand lever having positive acting motion transmitting connections with said portion of said device, whereby to positively shift any of said gears in accordance with the position of said portion.

45. In a machine tool including transmission mechanism having a first and second gear set, each having a plurality of gears shiftable to interchangeably transmit power and connected for one set to receive power from the other, each of said gears having a power-transmitting and an alternative non-power-transmitting position, the combination of a control device including a hand lever movable in opposite directions, means connected for movement from said hand lever in the one direction to invariably shift the gears of one of said sets to their non-power-transmitting positions irrespective of prior gear positions, and means positively connected for movement from the movement of said hand lever in the other direction to positively shift any of said gears to power-transmitting positions, the last named means including a portion adjustable for predetermining the gear or gears to be shifted.

In witness whereof I hereto affix my signature.

JOSEPH B. ARMITAGE.